(12) United States Patent
Kragl et al.

(10) Patent No.: US 6,473,555 B1
(45) Date of Patent: Oct. 29, 2002

(54) OPTICAL FIBER

(75) Inventors: Hans Kragl, Diekholzen; Michael Loddoch, Hildesheim, both of (DE)

(73) Assignee: Harting Elektro-Optische Bauteile GmbH & Co. KG (DE)

(*) Notice: Subject to any disclaimer, the term of this patent is extended or adjusted under 35 U.S.C. 154(b) by 0 days.

(21) Appl. No.: 09/463,258

(22) PCT Filed: Sep. 21, 1999

(86) PCT No.: PCT/EP99/06970

§ 371 (c)(1),
(2), (4) Date: Jan. 20, 2000

(87) PCT Pub. No.: WO00/17678

PCT Pub. Date: Mar. 30, 2000

(30) Foreign Application Priority Data

Sep. 21, 1998  (DE) .......................... 198 43 164

(51) Int. Cl.⁷ .............................. G02B 6/04; G02B 6/10
(52) U.S. Cl. ......................................... 385/146; 385/121
(58) Field of Search .................. 385/115, 121, 385/123–128, 141–146; 65/403

(56) References Cited

U.S. PATENT DOCUMENTS

| | | | | |
|---|---|---|---|---|
| 3,878,399 A | | 4/1975 | Higuchi et al. ............. 250/570 |
| 4,530,565 A | * | 7/1985 | Markle ........................ 385/121 |
| 4,688,884 A | | 8/1987 | Scifres et al. ............ 350/96.15 |
| 4,763,975 A | * | 8/1988 | Scifres et al. ................. 385/33 |
| 4,952,022 A | * | 8/1990 | Genovese ................... 385/116 |
| 5,153,932 A | * | 10/1992 | Blyler, Jr. et al. ............ 385/15 |
| 5,838,865 A | * | 11/1998 | Gulick ........................ 385/121 |

FOREIGN PATENT DOCUMENTS

| | | | |
|---|---|---|---|
| DE | 29 10 637 | 9/1980 | ............ G02B/5/14 |
| DE | 195 13 616 A1 | * 10/1995 | |
| EP | 0 363 853 | * 10/1989 | |
| EP | 0 363 853 | 4/1990 | ............ G02B/6/28 |
| EP | 0 715 192 A1 | * 11/1995 | |
| EP | 0 833 174 | 1/1998 | ............ G02B/6/28 |
| GB | 1 493 660 | * 11/1977 | |

* cited by examiner

Primary Examiner—Akm E. Ullah
Assistant Examiner—Michelle R. Connelly-Cushwa
(74) Attorney, Agent, or Firm—Hayes Soloway P.C.

(57) ABSTRACT

Described is a polymer optical fiber including a section having a circular cross-section and a section having a non-circular cross-section. Also described are optical components containing such an optical fiber, as well as a method of fabricating such an optical fiber.

2 Claims, 5 Drawing Sheets

OPTICAL FIBER

The invention relates to a polymer optical fiber.

Polymer optical fibers are commercially available with circular cross-sections, resulting from the optical fibers being extruded in production, it being the circular cross-section which is the geometric shape easiest to produce with optimum precision.

When, however, at the user end the polymer optical fiber having a circular cross-section needs to be coupled to modules handling the functions of distributing and coupling the light into and out of the system the circular cross-section proves to be of advantage only conditionally since optimum lossless coupling to the module requires connecting parts having likewise a circular cross-section. Round structures can be machined by drilling and turning; however, producing circular cross-section structures by shaping techniques as employed preferably nowadays for cost-effective production of integrated optical components is difficult. Such components produced by a shaping technique contain optical waveguides which for production engineering reasons normally have a non-circular cross-section. When a polymer optical fiber having a circular cross-section is coupled to an integrated optical waveguide having the same cross-sectional area in a square shape, coupling losses of approx. 1 dB materialize when coupling is done from the optical fiber to the waveguide and then back again to the optical fiber, assuming a uniform illumination of the optical fiber. If the non-round waveguide cross-section is selected so large that it covers the round polymer optical fiber then although there are no losses in the transfer from the optical fiber to the waveguide, the losses in the reverse light path direction are all the more.

Also of a disadvantage with circular cross-sections is the reduced packing density. When circular cross-sections are employed densely packed, a large surface area portion remains unused, namely the surface area portion located between the circular cross-sections. Similar disadvantages materialize in the design of micro-optical splitters in which the input fiber of circular cross-section is usually mounted on the output fibers positioned side by side and having likewise a circular cross-section. The light incident in the gusset portion of the circular output fibers is lost and contributes towards the excess loss of the component.

It is the object of the invention to provide an optical fiber permitting a practically lossless exit of light guided in the optical fiber and having practically any desired cross-sectional shape.

For this purpose the polymer optical fiber in accordance with the invention is provided with a section having a circular cross-section as well as a section having a non-circular cross-section, a smooth transition from one cross-sectional shape to the other being provided between these two sections. The gist of the invention expressed simply is to reshape the polymer optical fiber at the desired location, for example in the region of its end face, such that the desired cross-sectional shape is attained. This cross-sectional shape may be configured polygonal, angular, square, elliptical, semicircular annular or otherwise as dictated merely by the existing requirements. When light is to be coupled into a waveguide of square cross-section from an optical fiber a square cross-section of the optical fiber is selected in the reshaped section, thus enabling the two cross-sections to be adjoined flush with no coupling loss.

With an optical fiber configured as such, greatly differing optical components can be formed. In accordance with one embodiment of the invention it is provided for that a splitter having one input fiber and two output fibers is formed, each fiber having a rectangular cross-section. In this way the resulting losses are reduced since the two output fibers can be arranged directly side by side without a portion existing in between which is not made use of for coupling.

In accordance with an alternative embodiment a splitter may also be formed having an input fiber and an output fiber, the input fiber having a circular cross-section and each of the two output fibers having a semicircular annular cross-section, the inner diameter of the two semicircular annular cross-sections equalling the outer diameter of the circular cross-section. The two semicircular annular optical fibers surround the input fiber in a contacting portion totally so that in this portion lossless coupling from the input fiber into the output fibers is attained.

In accordance with a further embodiment the component may be an array of several optical fibers, each of which has a rectangular cross-section. Due to the selected cross-sectional shape a very much higher packing density is achievable than with optical fibers having a circular cross-section.

The optical component may also be an illuminating element. In this arrangement the end face for light emission is freely designable to optical considerations. For example, by bundling several optical fibers a numerical display element is attainable in which the free end faces of the optical fibers have an elliptical cross-section.

A polymer optical fiber having a circular cross-section may be partially reshaped in accordance with the invention by a method involving the following steps: first the optical fiber is located by the section to be reshaped between two parts of a tool which in the closed condition define a recess whose cross-section corresponds to the cross-section of the reshaped optical fiber. The tool is then heated and the two parts of the tool are pressed together, the optical fiber thereby adapting to the recess between the two tool parts, after which the tool is cooled. Once the tool and the optical fiber contained therein have cooled the tool is opened and the optical fiber can be removed. By this method the optical fiber can be reshaped as desired at comparatively little cost and with high precision.

Provided outside of the tool is preferably a holding device for the optical fiber, this serving to prevent a shortening of the optical fiber when heated.

Advantageous aspects of the invention read from the subclaims.

The invention will now be described by way of various embodiments as illustrated in the accompanying drawings in which.

With reference to FIGS. 1 to 4 the problems associated with coupling an optical fiber of circular cross-section to another component not having likewise a circular cross-section which can be made coincident with the end face of the optical fiber will first be explained.

Figure 1:
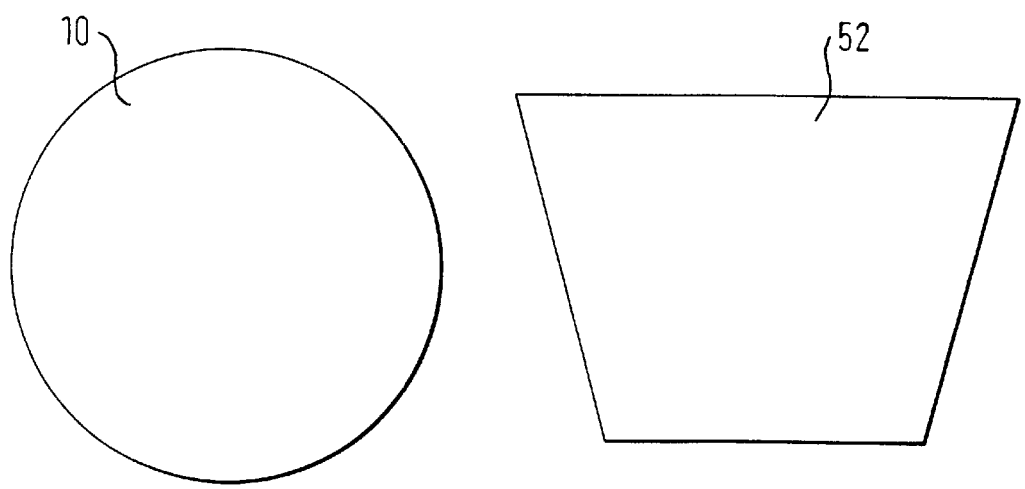
FIG. 1 is a schematic cross-sectional view of an optical fiber and a waveguide which can be coupled to each other by means of a connector part in accordance with the invention.
Figure 2:
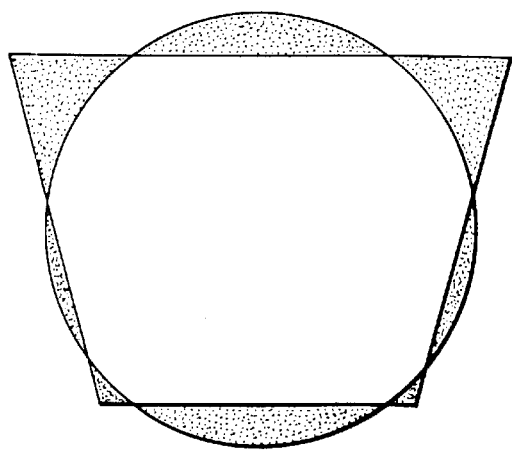
FIG. 2 is a comparison of the cross-sections as shown in FIG. 1.
Figure 3:
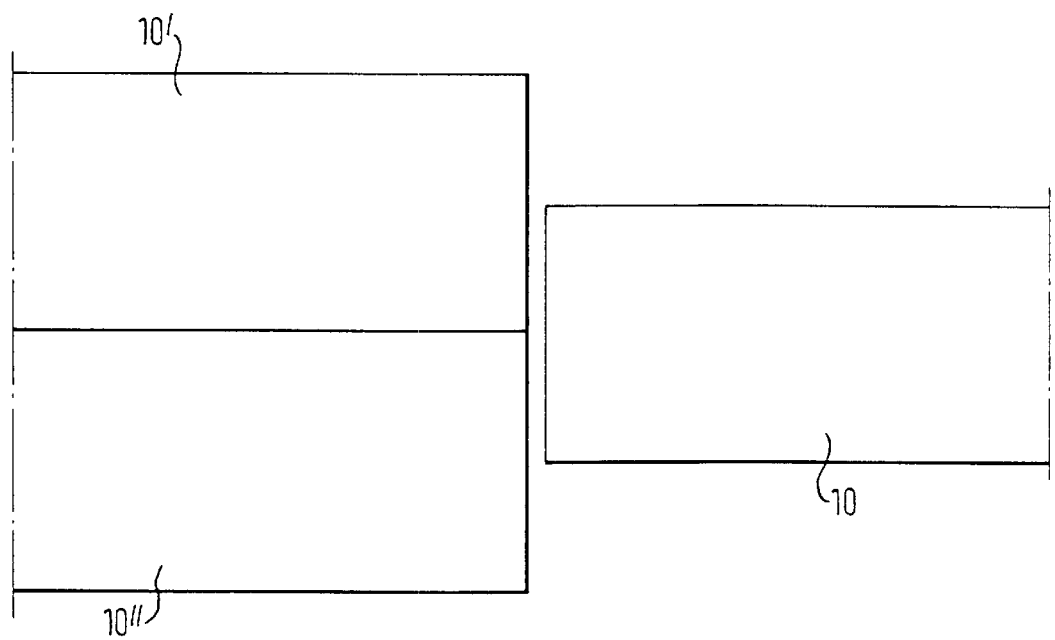
FIG. 3 is a plan view on optical fibers forming a splitter.
Figure 4:
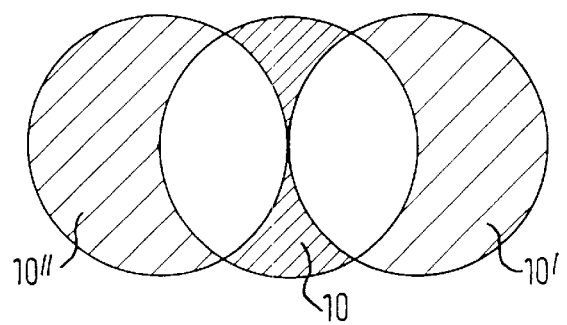
FIG. 4 is a comparison of the cross-sections of the optical fibers of the component as shown in FIG. 3.

A polymer optical fiber 10 typically has a circular cross-section as a result of it being produced by extrusion. In integrated optical components waveguides 52 are usually employed which for reasons of shapability preferably comprise a polygonal cross-section; achieving a round cross-section is hardly possible by shaping for the waveguide due to the undercuts. In FIG. 2 the two different cross-sections of an optical fiber and a waveguide are compared to each other for the same cross-sectional area, the portions of the cross-sections lacking coincidence and which are the cause of emission losses, being indicated shaded. Similar problems result for a splitter as shown in FIG. 3 comprising an input fiber 10 coupled to two output fibers 10', 10". As evident from the comparison of the cross-sections as shown in FIG. 4 considerable losses materialize since in coupling from the input fiber 10 to the output fibers 10', 10" the gusset portion between the two output fibers is not made use of for coupling, whereas if light needs to be coupled from the output fibers 10', 10" into the input fiber 10 losses materialize due to the outlying cross-sectional portions of each optical fiber failing to coincide with the cross-section of the input fiber.

To minimize the emission losses it is desirable that the cross-sections to be coupled to each other are identical. For this purpose a section 12 of the optical fiber is reshaped such that the desired cross-section is achieved. Reshaping may be done by means of a tool, shown schematically in FIG. 5. The tool consists of a bottom part 96 and a cover part 98. Configured in the bottom part 96 is a recess 94 in the form of a guide groove whose cross-section corresponds to that of the optical fiber in the reshaped condition. The optical fiber 10 is placed in the guide groove 94 by its section 12 to be reshaped. Subsequently the cover part 98 is lowered until it is in contact with the optical fiber in the section 12 to be reshaped, i.e. slightly locating the optical fiber in the guide groove.

Then the tool and thus the optical fiber is heated, this being preferably done by heating both the bottom part 96 and the cover part 98. It is to be noted, however, that when polymer optical fibers are heated their cross-section is increased whilst at the same time the length is reduced. The reason for this behavior is the extruding process put to use in production which in cooling down of the plastics material results in the axially oriented stresses in the plastics material being frozen in place. On heating, these stresses are relaxed, resulting in the fiber becoming thicker. This thickening of the fiber needs to be avoided, however, since it results in an increase in the mode number which leads to emission losses in the passage of light from the thicker part to the thinner part. To avoid the fiber becoming thicker on relaxation of the frozen-in stress conditions the fiber needs to be fixed in place outside of the portion where the reshaping takes place, so that it cannot contract axially in reshaping. For this purpose a holding device (not shown in the figures) is provided outside of the tool which suitably locks the optical fiber in place in preventing the contraction. Due to heating the bottom part 96 and the cover part 98 the section 12 of the optical fiber 10 to be reshaped is heated up to the range of the glass transition temperature. Now, the cover part 98 can be moved by an increase in pressure against the optical fiber, causing it to be deformed. Within the tool the contact pressure between the cover part and the bottom part prevents lengthwise contraction of the optical fiber. When the optical fiber has attained the desired geometry the bottom part 96, the cover part 98 and the optical fiber are cooled together, the optical fiber solidifying in the shape as dictated by the tool. Lifting off the cover part 98 then enables the reshaped fiber to be removed (see FIG. 6). Unlike the configuration of the tool as shown a recess may also be made use of to receive the section 12 of the optical fiber to be reshaped which is partly configured in the bottom part 96 and partly in the cover part 98, it also not being necessary that the recess in the bottom part and/or the cover part has a constant cross-section, i.e. its shape may vary.

Figure 5:
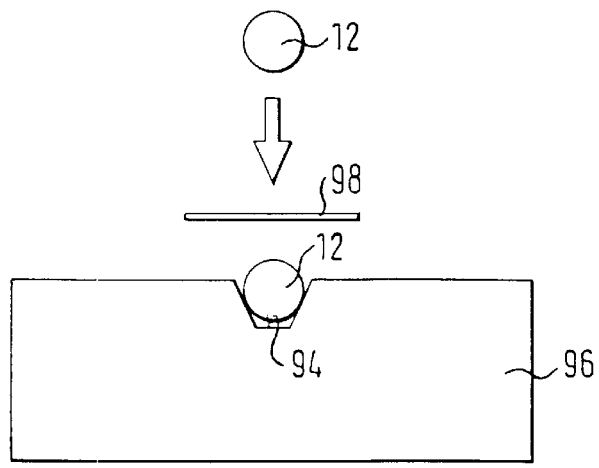
FIG. 5 is a schematic view of an optical fiber and a tool for producing an optical fiber.
Figure 6:
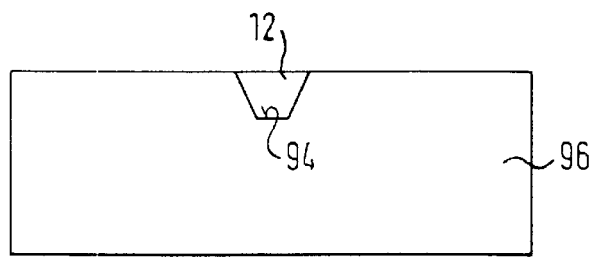
FIG. 6 is a schematic view of the optical fiber and the tool after reshaping the optical fiber.
Figure 7:
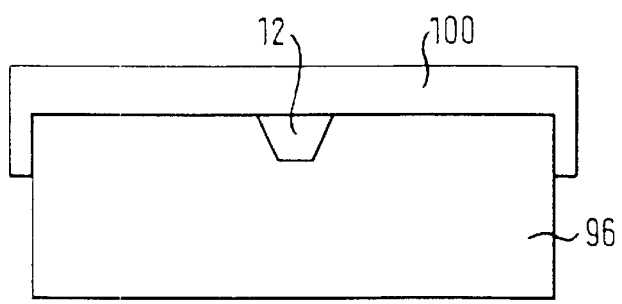
FIG. 7 is a schematic view of a further step in producing a component provided with the reshaped optical fiber.
Figure 8:
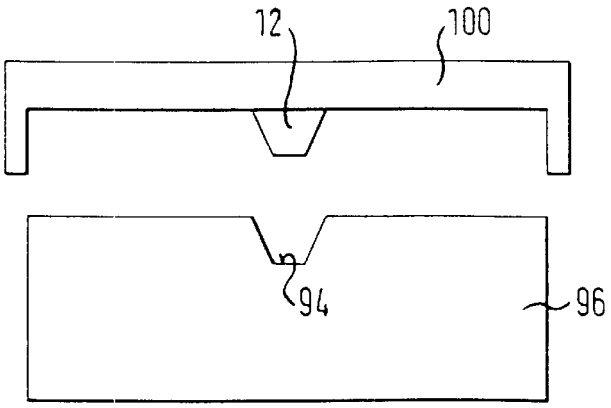
FIG. 8 shows the finished component being lifted from the tool used for its production.

By suitably shaping the recess an optical fiber is attainable having a reshaped section 12 with a cross-section in practically any shape required. In the example as shown in FIGS. 5 and 6 the reshaped optical fiber may be molded with a connector part 100 with which it can be secured to a substrate in which a waveguide is configured having likewise a trapezoidal cross-section.

Figure 9:
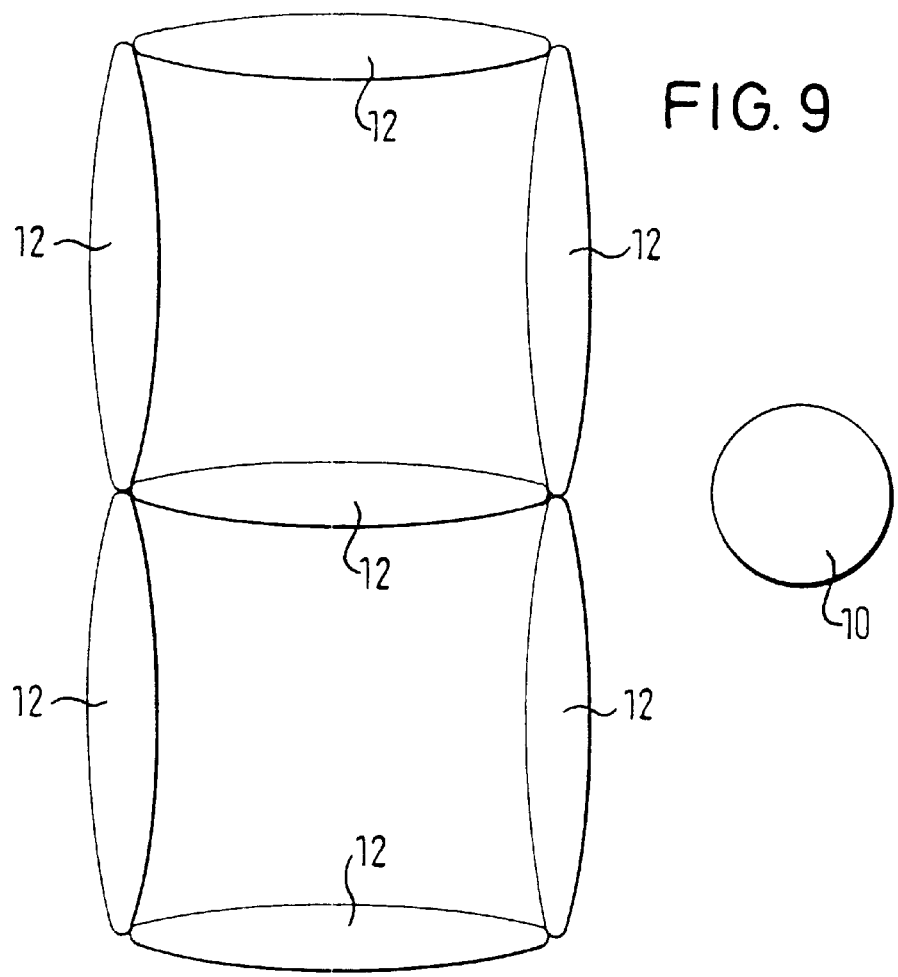
FIG. 9 illustrates a numerical display element formed by optical fibers in accordance with the invention.

Referring now to FIG. 9 there is illustrated a numerical display element composed of a total of eight optical waveguides, seven of which are configured with a reshaped, in this case strongly flattened section 12 of elliptical cross-section in the region of their end faces.

Figure 10:
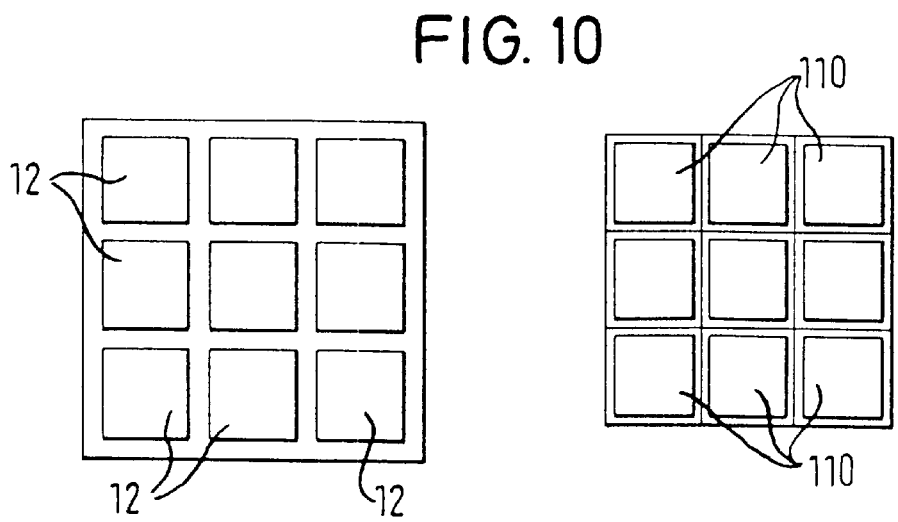
FIG. 10 illustrates an array of optical fibers in accordance with the invention.

Referring now to FIG. 10 there is illustrated an array of a total of nine optical waveguides, each of which has a square cross-section, thus enabling a high packing density to be achieved. The optical waveguides may be coupled to an array of surface-emitting LEDs 110 likewise arranged in an array of 3×3 elements.

Figure 11:
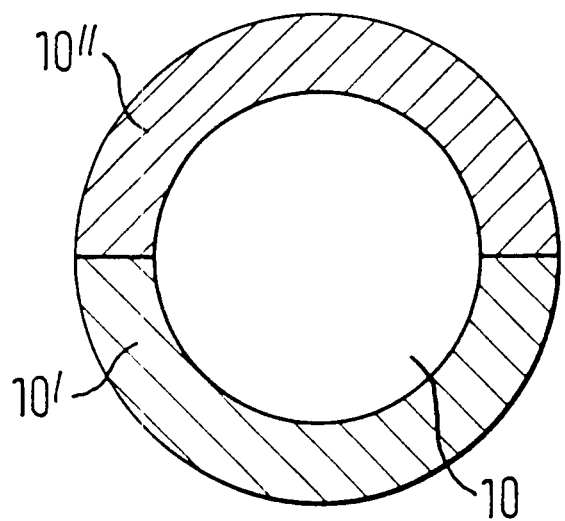
FIG. 11 illustrates a splitter formed by optical fibers in accordance with the invention.

Referring now to FIG. 11 there is illustrated a microoptical splitter consisting of an input fiber 10 of circular cross-section as well as two output fibers 10', 10", each of which has a semicircular annular cross-section. The inner diameter of the semicircular annular cross-section corresponds to the outer diameter of the circular cross-section so that the two semicircular annular output fibers 10', 10" snugly encompass the input fiber in a coupling portion. Coupling out the light from the input fiber 10 is done in the portion in which the input and output fibers contact each other, since it is in this portion that total reflection no longer takes place at the outer surface area of the fiber.

Common to all embodiments is that the optical fiber comprises, starting from a section of round cross-section, a transition section and adjoining this a section of non-circular cross-section. Due to the smooth transition between the reshaped section of non-circular cross-section and the non-shaped section of circular cross-section no losses materialize whatsoever in the transition from one cross-sectional shape to the other.

What is claimed is:

1. A polymer optical fiber including a section having a circular cross-section and a section having a non-circular cross-section, wherein said non-circular cross-section is a semicircular annular cross-section.

2. A splitter having one input fiber and two output fibers, said input fiber having a circular cross-section and said two output fibers each having a semicircular annular cross-section, the inner diameter of said two semicircular annular cross-sections equaling the outer diameter of said circular cross-section.

* * * * *